United States Patent [19]

Yamada et al.

[11] Patent Number: 4,948,400

[45] Date of Patent: Aug. 14, 1990

[54] SEPARATION MEMBRANES AND PROCESS FOR PREPARING THE SAME

[75] Inventors: Yasuharu Yamada; Nobuyuki Furukawa; Masaya Furukawa, all of Kitakyushu, Japan

[73] Assignee: Nippon Steel Chemical Co., Ltd., Tokyo, Japan

[21] Appl. No.: 372,995

[22] Filed: Jun. 28, 1989

[30] Foreign Application Priority Data

Jun. 30, 1988 [JP] Japan .................... 63-162991
Apr. 28, 1989 [JP] Japan .................... 63-107287

[51] Int. Cl.$^5$ .................... B01D 53/22; B01D 71/64
[52] U.S. Cl. .................... 55/158; 55/16; 528/310; 528/335
[58] Field of Search .................... 55/16, 158; 210/500.39; 528/310, 332, 335, 340

[56] References Cited

U.S. PATENT DOCUMENTS

| | | | |
|---|---|---|---|
| Re. 30,351 | 7/1980 | Hoehn et al. .................... | 55/16 |
| 3,822,202 | 7/1974 | Hoehn .................... | 55/16 |
| 4,378,400 | 3/1983 | Makino .................... | 428/220 |
| 4,493,714 | 1/1985 | Ueda et al. .................... | 55/16 |
| 4,528,004 | 7/1985 | Makino et al. .................... | 55/16 X |
| 4,690,873 | 9/1987 | Makino et al. .................... | 210/500.39 X |
| 4,717,393 | 1/1988 | Hayes .................... | 210/500.39 X |
| 4,717,394 | 1/1988 | Hayes .................... | 55/158 X |
| 4,832,713 | 5/1989 | Yamada et al. .................... | 210/500.39 X |
| 4,838,900 | 6/1989 | Hayes .................... | 210/500.39 X |

FOREIGN PATENT DOCUMENTS

| | | | |
|---|---|---|---|
| 59-049804 | 3/1984 | Japan .................... | 55/158 |
| 59-115738 | 7/1984 | Japan . | |
| 59-127603 | 7/1984 | Japan . | |
| 59-225705 | 12/1984 | Japan .................... | 55/158 |
| 60-071023 | 4/1985 | Japan .................... | 55/158 |
| 60-82103 | 5/1985 | Japan . | |
| 60-257805 | 12/1985 | Japan . | |
| 61-074627 | 4/1986 | Japan .................... | 55/158 |
| 61-187904 | 8/1986 | Japan .................... | 55/158 |
| 63-143923 | 6/1988 | Japan .................... | 55/16 |

*Primary Examiner*—Robert Spitzer
*Attorney, Agent, or Firm*—Armstrong, Nikaido, Marmelstein, Kubovcik & Murray

[57] ABSTRACT

Polyimide-based separation membranes of this invention are made from polyimides having repeating units of the general formulas (A) and (B)

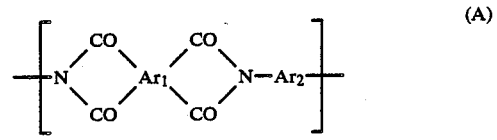

(A)

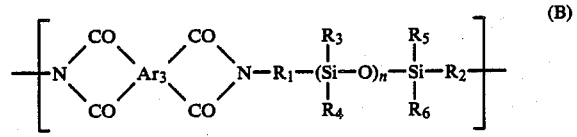

(B)

wherein $Ar_1$ and $Ar_3$ are tetravalent aromatic radicals containing at least one aromatic ring, $Ar_2$ is a divalent aromatic radical containing at least one aromatic ring, $R_1$ and $R_2$ are organic radicals, $R_3$ to $R_6$ are monovalent hydrocarbon radicals, and n is an integer from 1 to 50 at a mole ratio (A)/(B) of 5/95 to 95/5, have high gas permeation coefficients, high mechanical strength, and excellent heat resistance, and are useful for separation and concentration of mixed gases.

11 Claims, No Drawings

SEPARATION MEMBRANES AND PROCESS FOR PREPARING THE SAME

FIELD OF THE INVENTION AND RELATED ART STATEMENT

This invention relates to separation membranes and a process for preparing the same and, more particularly, to polyimide-based separation membranes containing specific silicone blocks in polyimide matrixes.

Polyimides from pyromellitic dianhydride and aromatic diamines, from biphenyltetracarboxylic dianhydrides and aromatic diamines, or from aliphatic acid dianhydrides and aromatic diamines have been disclosed in U.S. Pat. No. 4,378,400, Japan Tokkyo Kokai Koho Nos. 60-82,103 (1985), and 60-257,805 (1985) as polyimide-based materials for gas separation membranes. All of the polyimides reported, however, show low gas transmission rates and their application to gas separation requires a larger membrane area, which would increase the cost of separation and make commercialization difficult.

Silicone membranes, for example of polydimethylsiloxanes, have been known for enrichment of oxygen. A membrane of this type has a high gas permeation coefficient but low mechanical strength, which has made it difficult to decrease the membrane thickness or eventually to increase the gas transmission rates. In addition, the membrane in question shows low gas permselectivity and it is mandatory to build a large apparatus to maintain an adequate gas separation capacity.

Furthermore, mixed gases to be separated sometimes occur at elevated temperatures and, in such cases, the materials for separation membranes need to be heat-resistant and mechanically strong.

OBJECT AND SUMMARY OF THE INVENTION

This invention has resulted from the attempts to solve the above-mentioned problems and it is an object of this invention to provide novel separation membranes possessing high gas permeation coefficients and permselectivities, excellent mechanical properties, thermal stabilities and low moisture resistances.

Another object of this invention is to provide polyimide-based separation membranes which have a microphase separated structure and perform excellently in gas transmission and gas separation with high mechanical properties and heat resistance.

A further object of this invention is to provide polyimide-based separation membranes which are applicable to the separation and concentration of mixed gases and are particularly useful for the separation of oxygen and nitrogen.

A still further object of this invention is to provide a process for the preparation of polyimide-based separation membranes having the aforesaid excellent properties.

This invention relates to polyimide-based separation membranes made from polyimides which have repeating units of the general formulas (A) and (B)

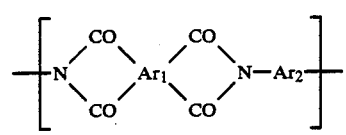

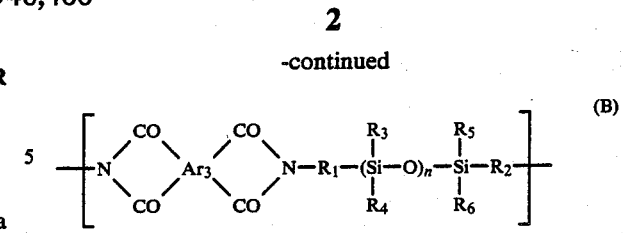

wherein $Ar_1$ and $Ar_3$ are tetravalent aromatic radicals containing at least one aromatic ring, $Ar_2$ is a divalent aromatic radical containing at least one aromatic ring, $R_1$ and $R_2$ are divalent organic radicals, $R_3$ to $R_6$ are monovalent hydrocarbon radicals, and n is an integer from 1 to 50 at a mole ratio (A)/(B) of 5/95 to 95/5.

In the process of this invention, the tetravalent aromatic radicals $Ar_1$ and $Ar_3$ in the repeating units of the general formulas (A) and (B) may, for example, be as follows:

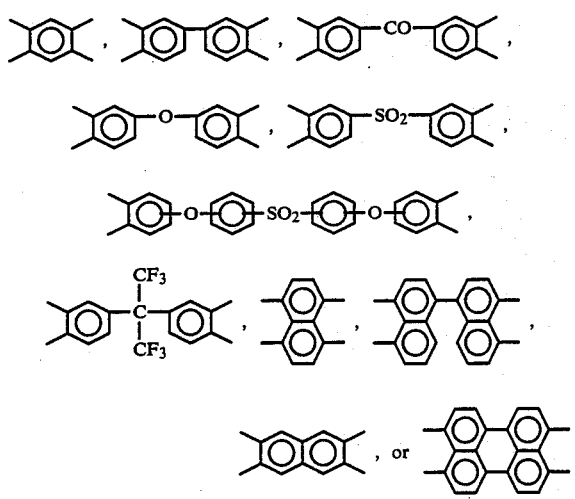

The aromatic radicals $Ar_1$ and $Ar_3$ in a given polyimide structure may be identical to each other or each may contain two or more different radicals.

The divalent aromatic radical $Ar_2$ in the general formula (A) may be as follows:

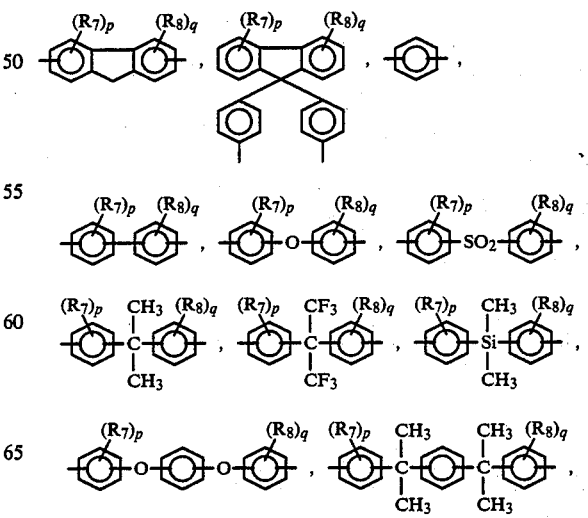

-continued

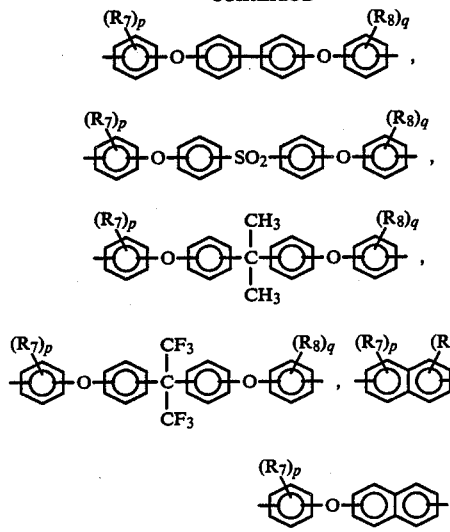

$R_7$ and $R_8$ are monovalent hydrocarbon radicals, and p and q are integer from 0 to 4. Like $Ar_1$ and $Ar_3$, the radical $Ar_2$ in a given polyimide structure may be one and the same radical or a mixture of two or more radicals.

The organic radicals $R_1$ and $R_2$ and the hydrocarbon radicals $R_3$, $R_4$, $R_5$, and $R_6$ in the repeating unit of the general formula (B) are not limited to any particular radicals, but $R_1$ and $R_2$ are preferably any of

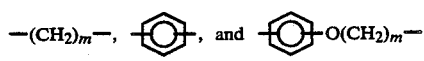

wherein m is an integer from 1 to 3 and $R_3$, $R_4$, $R_5$, and $R_6$ are preferably methyl or phenyl. The integer n in the repeating unit of the general formula (B) is from 1 to 50, preferably from 1 to 30.

The polyimides containing diaminosiloxane blocks to be used in the process of this invention have the mole ratio of the repeating unit of the general formula (A) to that of the general formula (B) in the range of 5/95 to 95/5, preferably 1/9 to 9/1. Separation membranes of good properties and performance intended by this invention cannot be obtained if the mole ratio (A)/(B) falls outside of this range. A satisfactory gas permeation coefficient is not obtained at a ratio of less than 5/95 while sufficiently high heat resistance, mechanical properties, and gas permselectivity are not obtained at a ratio of more than 95/5.

The polyimide-based separation membranes of this invention can generally be prepared by the reaction of aromatic tetracarboxylic acid dianhydrides, aromatic diamines, and diaminosiloxanes of the general formula (C)

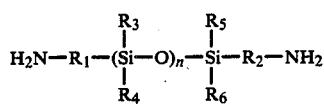 (C)

wherein $R_1$ and $R_2$ are divalent organic radicals, $R_3$ to $R_6$ are monovalent hydrocarbon radicals, and n is an integer from 1 to 50.

Examples of the diaminosiloxanes of the general formula (C) useful for the preparation of the polyimide-based separation membranes of this invention include

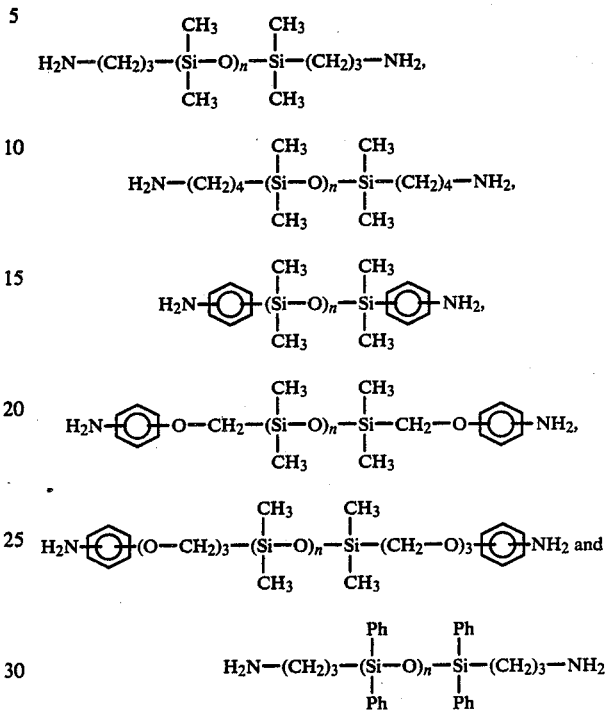

Such diaminosiloxanes may be used singly or mixed. The average of the integer n in the above-mentioned diaminosiloxanes is normally from 1 to 50, preferably from 1 to 30.

The aromatic diamines from which the aromatic radical $Ar_2$ is derived in the preparation of the polyimide-based separation membranes of this invention should preferably show affinity to the diaminosiloxanes and contain at least two aromatic rings.

The following processes are available for the preparation of the polyimide-based separation membranes described above.

(1) A diaminosiloxane of the general formula (C) and the aromatic diamine are dissolved in a polymerization solvent, the tetracarboxylic acid dianhydride is added as solid or as a solution in the polymerization solvent, and the resulting mixture is allowed to react.

(2) The tetracarboxylic acid dianhydride is dissolved or dispersed in a polymerization solvent, the diaminosiloxane is added and allowed to react, the aromatic diamine is then added as solid or as a solution in the polymerization solvent and allowed to react.

(3) The tetracarboxylic acid dianhydride is dissolved or dispersed in a polymerization solvent, the aromatic diamine is added as solid or as a solution in the polymerization solvent, the diaminosiloxane is then added and allowed to react, and the aromatic diamine is added and allowed to react.

(4) The tetracarboxylic acid dianhydride and all the amine components are simultaneously added to a polymerization solvent and allowed to react.

(5) The tetracarboxylic acid dianhydride and all the amine components are introduced into a reactor, a polymerization solvent is added, and the mixture is allowed to react.

Of the processes described above, the process (2) is best suited for the preparation of polyimide-based separation membranes containing a uniform dispersion of the diaminosiloxane blocks. Here, the tetracarboxylic acid dianhydride in whole is dissolved or dispersed in a polymerization solvent, a diaminosiloxane of the general formula (C) or its solution in the polymerization solvent is added to form siloxane-modified polybasic carboxylic acids of the formula

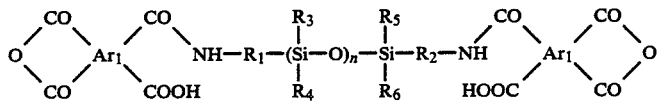

wherein $Ar_1$, $R_1$, $R_2$, and $R_3$ to $R_6$ are as defined previously and the solution containing the acids is mixed with the aromatic diamine.

A process such as this yields polyimide-based separation membranes containing microphase separation corresponding to the length of the siloxane blocks and showing excellent gas transmission, gas separation, mechanical properties, and heat resistance.

The solvents applicable to the reaction in question are exemplified by aprotic polar solvents such as N-methyl-2-pyrrolidone, N,N-dimethylacetamide, dimethylformamide, dimethyl sulfoxide, and hexamethylphosphoramide, phenols such as m-cresol, o-cresol, m-chlorophenol, and o-chlorophenol, and ethers such as diethylene glycol dimethyl ether (diglyme), diethylene glycol diethyl ether, dioxane, and tetrahydrofuran. These solvents can be used singly or mixed. In addition, nonpolar solvents such as benzene, benzonitrile, butyrolactone, xylene, toluene, and cyclohexane may be used in part as levelling or emulsifying agent. Diethylene glycol dimethyl ether (diglyme) is particularly desirable as it is a good solvent of the diaminosiloxanes and is used preferably at a proportion of 30% by weight or more of the total polymerization solvent.

The first-stage reaction for the preparation of the polyimide precursors is preferably carried out at a relatively low temperature of, for example, 50° C. or less.

It is desirable for the polyimide precursors containing the diaminosiloxane blocks to have a molecular weight sufficiently high for the formation of films, namely to have a logarithmic viscosity $(\eta_{ihn})$ of 0.3 or more, preferably 0.5 or more, as determined in N-methyl-2-pyrrolidone at a concentration of 0.5 g/dl at 30° C. The logarithmic viscosity is defined as $$\eta_{ihn} = \ln(\eta_{rel})/c$$

wherein c is the concentration of the polymer solution expressed in grams of the polymers per 100 ml of the solvent and $(\eta_{ihn})$ is the relative viscosity or the ratio of the flow rate of the polymer solution to that of the solvent as determined in a capillary viscometer.

The polyimide precursors thus obtained are imidized in such manners as the following.

(1) The precursor is directly dehydrated into polyimide by heating.

(2) The polyamic acid solution is mixed with an imidization catalyst such as a tertiary amine or an acid anhydride, cast on a support such as a glass plate, and dehydrated at room temperature or under heat into polyimide.

(3) The precursor is thrown into a large quantity of poor solvent such as acetone and the separated powder is filtered and dried by heating to form polyimide.

(4) The precursor is dehydrated in an imidization catalyst such as a tertiary amine or an acid anhydride or in an organic solution containing such a catalyst at room temperature or under heat to form polyimide.

The following processes are applicable to the preparation of the separation membranes of this invention.

(1) The polyimide precursor solution is cast on a support such as a glass plate and heat-treated.

(2) The polyimide precursor solution is cast on a support, gelled by immersion in a bad solvent such as water, alcohol, and hexane, dried, and heat-treated.

(3) The precursor is pre-imidized in a solvent, cast into a film, dried, and heat-treated.

(4) The polyimide solution is cast on a support, gelled by immersion in a solvent as in (2) above, dried, and heat-treated.

Of the above-mentioned processes, a desirable one is based on making the polyimide precursor solution into a membrane followed by the imidization reaction and another is based on dissolving the polyimides of this invention having the repeating units of the general formulas (A) and (B) at a specified mole ratio (A)/(B) ratio in an adequate solvent, making the solution into a membrane, and removing the solvent.

The thickness of the membrane, although not subject to any restriction, normally ranges from 1 to 100 $\mu$m. The membrane may be flat or hollow fibers.

The formulations for the polyimide-based separation membranes of this invention may contain other resins, in particular other polyimides, antioxidants, heat stabilizers, ultraviolet absorbers, colorants, and fillers in addition to the aforesaid polyimides.

The polyimide membranes thus prepared possess high heat resistance, gas transmission rates, permselectivities, and mechanical strength and are useful for separation membranes.

The polyimide-based separation membranes of this invention excel in selective permeation of gases, possess sufficient mechanical strength and ease of handling required for practical applications, and are useful for enriching a desired component in mixed gases in many areas such as the following: recovery of helium from natural gas; concentration of hydrogen from the effluent stream in the hydrogenation reaction; enrichment of oxygen for the aeration in wastewater treatment, for the fermentation industries, for the boilers and incinerators requiring high combustion temperatures, for medical oxygen respirators, and for the aeration of fish farming ponds; for separation of oxygen, nitrogen, hydrogen, carbon dioxide, carbon monoxide, helium, argon, ammonia, alkanes (for example, methane and ethane), alkenes (for example, ethylene and propylene), steam, hydrogen sulfide, alkanols (for example, methanol and ethanol), and other gases and vapors separable by membrane permeation, for example, uranium and hexafluorouranium.

DETAILED DESCRIPTION OF THE PREFERRED EMBODIMENTS

This invention is explained in detail with reference to the accompanying examples and comparative examples, without being limited thereto.

EXAMPLE 1

Into a 500-ml four-necked flask fitted with a thermometer and a stirrer were introduced 32.2 g (0.1 mole) of benzophe nonetetracarboxylic acid dianhydride (BTDA) and 500 g of diethylene glycol dimethyl ether (diglyme) with stirring, 9.0 g (0.0069 mole) of diaminosiloxane of the following structure (amine equivalent 650) was added slowly in drops, and the mixture was allowed to react for about 30 minutes.

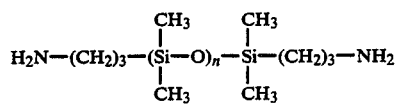

Upon completion of the reaction, 38.2 g (0.0931mole) of bis(4,4'-aminophenoxyphenyl)propane (BAPP) was added and the mixture was stirred for 5 hours to yield a yellow transparent solution of polyimide precursors. The precursors showed a logarithmic viscosity of 0.7.

The diglyme solution of the polyimide precursors thus obtained was cast on a glass plate with a doctor knife and the resulting thin membrane was heated at 60° C. for 30 minutes, at 180° C. for 30 minutes, and at 220° C. for 1 hour to yield a polyimide membrane with a thickness of 40 $\mu$m having a microphase separated structure.

The polyimide membrane obtained was tested for tensile modulus of elasticity (ASTM D-882-64T), tensile strength (ASTM D-882-64T), elongation (ASTM D-882-64T), glass transition temperature (determined by TMA at a test speed of 10° C./minute in an atmosphere of nitrogen), initial thermal decomposition temperature (temperature at which the 5% weight loss occurs by TGA), moisture absorption (determined at 23° C. and 78% relative humidity), and light transmission (determined at 500 nm). The results are shown in Table 1.

The polyimide membrane was also tested for its performance as gas separation membrane with the aid of a gas permeability testing apparatus according to Japanese Industrial Standard JIS Z 1707. The results are shown in Table 2.

COMPARATIVE EXAMPLE 1

The reaction was carried out as in Example 1 using 32.2 g (0.01 mole) of BTDA, 41.0 g (0.1 mole) of BAPP, and none of the diaminosiloxane and the resulting solution of the polyimide precursors was made into a polyimide membrane as in Example 1.

The polyimide membrane was tested, as in Example 1, for the basic properties and for the performance as a gas separation membrane. The results are shown in Tables 1 and 2.

TABLE 1

|  | Example 1 | Comparative example 1 |
|---|---|---|
| Tensile modulus of elasticity (kg/mm$^2$) | 195. | 245 |
| Tensile strength (kg/mm$^2$) | 10.1 | 14.5 |
| Elongation (%) | 17 | 13 |
| Glass transition temperature (°C.) | 201 | 230 |
| Initial thermal decomposition temperature (°C.) | 450 | 515 |
| Moisture absorption (wt %) | 0.5 | 1.0 |
| Light transmission (%) | 76.1 | 70.9 |

TABLE 2

|  | Gas transmission rate ml(STP)/(m$^2 \cdot$ hr $\cdot$ atm) | | Permselectivity |
|---|---|---|---|
|  | Nitrogen (N$_2$) | Oxygen (O$_2$) | $\frac{PO_2}{PN_2}$ |
| Example 1 | 46 | 320 | 7.0 |
| Comparative example 1 | 38 | 47 | 1.24 |

EXAMPLES 2–25

The reactions were carried out as in Example 1 using the reactants and the solvents shown in Table 3 and the resulting solutions of polyimide precursors were made into polyimide membranes with a thickness in the range of 20 to 40 $\mu$m. The polyimide membranes were tested for the gas permeation coefficient and the permselectivity. The results are shown in Table 3.

The gas permeation coefficient was calculated from the relationship:

$$\text{gas permeation coefficient } [cm^3 \text{ (STP)} \cdot cm/cm^2 \cdot sec \cdot cmHg] =$$
$$\text{gas transmission rate } [ml(STP)/m^2 \cdot hr \cdot atm] \times$$
$$\text{membrane thickness (m)} \times 3.7 \times 10^{-8}$$

The following abbreviations are used in Table 3:
NMP: N-Methyl-2-pyrrolidone
DIG: Diethylene glycol dimethyl ether
BTDA: 3,3',4,4'-Benzophenonetetracarboxylic acid dianhydride
BPDA: 3,3',4,4'-Diphenylsulfonetetracarboxylic acid dianhydride
6FBDA: 4,4'-(Hexafluoroisopropylidene)diphthalic acid dianhydride
PMDA: Pyromellitic dianhydride
BAPP: 2,2-Bis[4-(4-aminophenoxy)phenyl]propane
BAPS: Bis[4-(4-aminophenoxy)phenyl] sulfone
BAPF: 2,2-Bis[4-(4-aminophenoxy)phenyl]hexafluoropropane
TPE-Q: 1,4-Bis(4-aminophenoxy)benzene
TPE-R: 1,3-Bis(4-aminophenoxy)benzene
BisA-P: 4,4'-[1,4-Phenylenebis(1-methylethylidene)]bisaniline
BisA-AF: 2,2-Bis(4-aminophenyl)hexafluoropropane
FDA: 9,9-Bis(4-aminophenyl)fluorene
GAPD: Bis(3-aminopropyl)tetramethyldisiloxane
PSX-A: amine equivalent 1,280 (Mw=2,560)
PSX-B: amine equivalent 650 (Mw=1,300)
PSX-C: amine equivalent 472 (Mw=944)

TABLE 3

| Example No. | Tetracarboxylic acid dianhydride (g) | Diamino compound (g) | Diamino-siloxane (g) | Solvent NMP/DIG | Siloxane content (wt %) | Gas permeation coefficient Oxygen $PO_2$ | Gas permeation coefficient Nitrogen $PN_2$ | Permselectivity $\frac{PO_2}{PN_2}$ |
|---|---|---|---|---|---|---|---|---|
| 2 | BTDA 17.1 | BAPP 18.9 | PSX-B 9.0 | 0/100 | 20 | 11 | 5.2 | 2.1 |
| 3 | BTDA 18.7 | BAPP 21.8 | PSX-C 4.5 | 0/100 | 10 | 3.1 | 0.46 | 6.7 |
| 4 | BTDA 17.6 | BAPP 18.4 | PSX-C 9.0 | 0/100 | 20 | 63 | 26 | 2.4 |
| 5 | BTDA 14.5 | BAPP 12.5 | PSX-B 18.0 | 0/100 | 40 | 150 | 66 | 2.3 |
| 6 | BTDA 16.7 | BAPS 19.3 | PSX-B 9.0 | 50/50 | 20 | 0.96 | 0.21 | 4.6 |
| 7 | BTDA 20.0 | TPE-Q 16.0 | PSX-B 9.0 | 50/50 | 20 | 0.64 | 0.12 | 5.5 |
| 8 | BTDA 18.6 | BisA-P 17.4 | PSX-B 9.0 | 50/50 | 20 | 3.9 | 0.95 | 4.1 |
| 9 | BTDA 18.6 | BisA-M 17.4 | PSX-B 9.0 | 50/50 | 20 | 1.0 | 0.24 | 4.2 |
| 10 | BTDA 18.9 | BisA-AF 17.1 | PSX-B 9.0 | 50/50 | 20 | 6.1 | 1.8 | 3.4 |
| 11 | BPDA 16.3 | BAPP 19.7 | PSX-B 9.0 | 50/50 | 20 | 1.2 | 0.17 | 6.8 |
| 12 | BPDA 15.8 | BAPS 20.2 | PSX-B 9.0 | 50/50 | 20 | 0.64 | 0.16 | 4.0 |
| 13 | BPDA 17.7 | BisA-P 18.3 | PSX-B 9.0 | 50/50 | 20 | 2.0 | 0.41 | 4.9 |
| 14 | DSDA 18.2 | BAPP 17.3 | PSX-B 9.0 | 50/50 | 20 | 1.4 | 0.32 | 4.4 |
| 15 | DSDA 17.7 | BAPS 18.3 | PSX-B 9.0 | 50/50 | 20 | 1.5 | 0.23 | 6.5 |
| 16 | DSDA 17.5 | BAPP 16.3 | PSX-B 11.3 | 50/50 | 25 | 22 | 9.3 | 2.4 |
| 17 | DSDA 16.8 | BAPP 14.7 | PSX-B 13.5 | 50/50 | 30 | 87 | 38 | 2.3 |
| 18 | PMDA 6.6 BTDA 9.8 | BAPP 21.9 | PSX-B 6.8 | 25/75 | 15 | 1.6 | 0.43 | 3.7 |
| 19 | PMDA 6.2 BTDA 9.1 | BAPP 18.4 | PSX-B 11.3 | 25/75 | 25 | 18 | 7.5 | 2.4 |
| 20 | BTDA 15.2 | BAPF 20.8 | PSX-B 9.0 | 50/50 | 20 | 5.4 | 1.3 | 4.2 |
| 21 | 6FBDA 18.2 | BAPF 17.8 | PSX-B 9.0 | 50/50 | 20 | 8.9 | 2.2 | 4.0 |
| 22 | BTDA 20.0 | TPE-R 16.0 | PSX-B 9.0 | 50/50 | 20 | 0.48 | 0.079 | 6.1 |
| 23 | BTDA 15.2 | FDA 20.8 | PSX-B 9.0 | 50/50 | 20 | 4.7 | 0.92 | 5.4 |
| 24 | BPDA 14.4 | FDA 21.6 | PSX-B 9.0 | 50/50 | 20 | 4.2 | 0.78 | 5.4 |
| 25 | BTDA 16.5 | BAPP 19.5 | PSX-A 9.0 | 0/100 | 20 | 2.7 | 0.83 | 3.2 |

(Note)
The gas permeation coefficient is expressed in the unit of barrer which is equal to $10^{-10} \times \{cm^3 \text{ (STP)} \cdot cm/cm^2 \cdot sec \cdot cmHg\}$.

What is claimed is:

1. Polyimide-based separation membranes made from polyimides having repeating units of the general formulas (A) and (B)

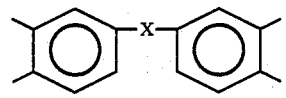

wherein $Ar_1$ and $Ar_3$ are tetravalent aromatic radicals containing at least one aromatic ring, $Ar_2$ is a divalent aromatic radical containig at least one aromatic ring, $R_1$ and $R_2$ are divalent organic radicals, $R_3$ to $R_6$ are monovalent hydrocarbon radicals, and n is an integer from 1 to 50 with the mole ratio of (A) to (B) falling in the range of 5/95 to 95/5.

2. Separation membranes according to claim 1 wherein $Ar_1$ and $Ar_3$ in the repeating units (A) and (B) are

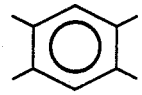

or radicals of the general formula wherein X is a single bond, —O—, —CO—, —SO$_2$—, or —C(CF$_3$)$_2$—.

3. Separation membranes according to claim 1 wherein $Ar_2$ in the repeating unit of the general formula (A) is

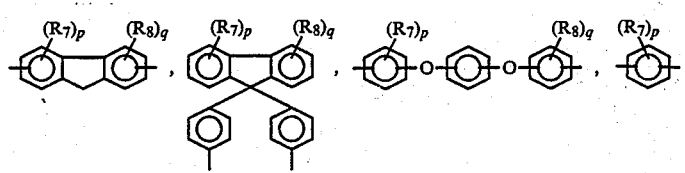

wherein $R_7$ and $R_8$ are monovalent hydrocarbon radicals and p and q are integer from 0 to 4, or a radical of the general formula

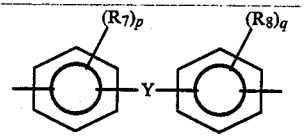

wherein Y is a single bond, —C(CF$_3$)$_2$—, —O—, —C(CH$_3$)$_2$—, —SO$_2$—, —CH$_2$—,

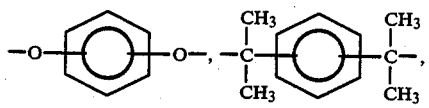

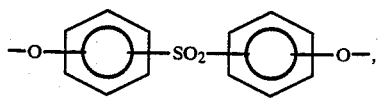

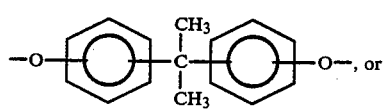

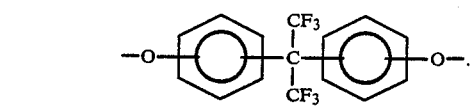

4. Separation membranes according to claim 1 wherein R$_1$ and R$_2$ in the repeating unit of the general formula (B) are —(CH$_2$)$_m$—,

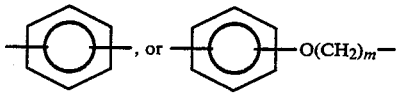

wherein m is an integer from 1 to 3.

5. Separation membranes according to claim 1 wherein R$_3$, R$_4$, R$_5$, and R$_6$ in the repeating unit of the general formula (B) are methyl or phenyl.

6. Separation membranes according to claim 1 wherein n in the repeating unit of the general formula (B) is from 1 to 30.

7. Separation membranes according to claim 1 wherein the polyimides have a microphase separated structure.

8. A process for the preparation of separation membranes which comprises forming polyimide precursors by the reaction of aromatic tetracarboxylic acid dianhydrides, aromatic diamines, and diaminosiloxanes of the general formula (C)

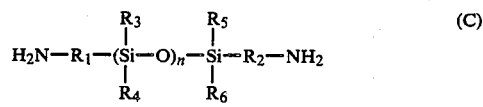

wherein R$_1$ and R$_2$ are divalent organic radicals, R$_3$ to R$_6$ are monovalent hydrocarbon radicals, and n is an integer from 1 to 50, making said precursors into a membrane, and imidizing said membrane.

9. A process for the preparation of separation membranes which comprises dissolving polyimides having the repeating units of the general formulas (A) and (B)

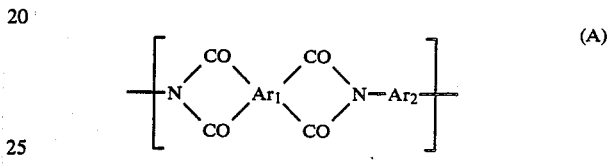

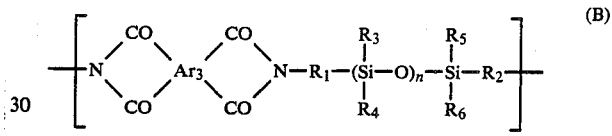

wherein Ar$_1$ and Ar$_3$ are tetravalent aromatic radicals containing at least one aromatic ring, Ar$_2$ is a divalent aromatic radical containing at least one aromatic ring, R$_1$ and R$_2$ are divalent organic radicals, R$_3$ to R$_6$ are monovalent hydrocarbon radicals, and n is an integer from 1 to 50, at a mole ratio (A)/(B) of 5/95 to 95/5 in a solvent, making said solution into a membrane, and removing said solvent.

10. A process for the preparation of separation membranes according to claim 8 or 9 wherein R$_1$ and R$_2$ are —(CH$_2$)$_m$—,

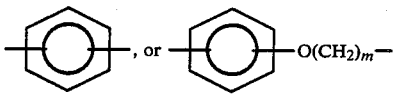

wherein m is an integer from 1 to 3.

11. A process for the preparation of separation membranes according to claim 8 or 9 wherein R$_3$, R$_4$, R$_5$, and R$_6$ are methyl or phenyl.

* * * * *

UNITED STATES PATENT AND TRADEMARK OFFICE
CERTIFICATE OF CORRECTION

PATENT NO. : 4,948,400

DATED : August 14, 1990

INVENTOR(S) : YAMADA et al

It is certified that error appears in the above-identified patent and that said Letters Patent is hereby corrected as shown below:

On the cover page, Item [30], "63-107287" should read --1-107287--.

Signed and Sealed this

Thirty-first Day of December, 1991

Attest:

HARRY F. MANBECK, JR.

*Attesting Officer*  *Commissioner of Patents and Trademarks*